(12) United States Patent
Blum

(10) Patent No.: US 8,640,948 B2
(45) Date of Patent: Feb. 4, 2014

(54) CARBON TRANSACTION CARD

(75) Inventor: Scott Alan Blum, Jackson, WY (US)

(73) Assignee: Black Card LLC, Jackson, WY (US)

(*) Notice: Subject to any disclaimer, the term of this patent is extended or adjusted under 35 U.S.C. 154(b) by 121 days.

(21) Appl. No.: 12/238,061

(22) Filed: Sep. 25, 2008

(65) Prior Publication Data

US 2009/0078776 A1 Mar. 26, 2009

Related U.S. Application Data

(60) Provisional application No. 60/975,051, filed on Sep. 25, 2007.

(51) Int. Cl.
*G06K 5/00* (2006.01)

(52) U.S. Cl.
USPC .......................... 235/380; 235/487

(58) Field of Classification Search
USPC .................. 235/487, 488, 380, 382, 375
See application file for complete search history.

(56) References Cited

U.S. PATENT DOCUMENTS

| | | | |
|---|---|---|---|
| 4,114,032 A | 9/1978 | Brosow et al. | |
| 4,643,453 A | 2/1987 | Shapiro et al. | |
| 4,803,114 A | 2/1989 | Schledorn | |
| 4,960,651 A * | 10/1990 | Pettigrew et al. | 428/607 |
| 5,214,566 A | 5/1993 | Dupre et al. | |
| 5,259,649 A | 11/1993 | Shomron | |
| 5,601,887 A | 2/1997 | Rich et al. | |
| 5,856,662 A | 1/1999 | Kohama et al. | |
| 6,581,839 B1 | 6/2003 | Lasch et al. | |
| 6,749,123 B2 | 6/2004 | Lasch et al. | |
| 6,764,014 B2 | 7/2004 | Lasch et al. | |
| 2003/0102538 A1 | 6/2003 | Paulus | |
| 2003/0169574 A1 | 9/2003 | Maruyama et al. | |
| 2005/0163985 A1* | 7/2005 | Dorfman | 428/216 |
| 2005/0194453 A1* | 9/2005 | Conner et al. | 235/492 |
| 2005/0194454 A1 | 9/2005 | Ferber et al. | |
| 2005/0211785 A1 | 9/2005 | Ferber et al. | |
| 2006/0038014 A1 | 2/2006 | Mann et al. | |
| 2007/0241201 A1* | 10/2007 | Brown et al. | 235/493 |
| 2010/0025475 A1* | 2/2010 | Webb et al. | 235/488 |

FOREIGN PATENT DOCUMENTS

| | | |
|---|---|---|
| CN | 1910600 A | 2/2007 |
| JP | 61-012167 U | 1/1986 |
| JP | 4269596 | 9/1992 |
| JP | 2007069493 | 3/2007 |

OTHER PUBLICATIONS

International Search Report from Korean Intellectual Property Office dated Jul. 6, 2009 for relating International Application No. PCT/US2008/077707.
Written Opinion of the International Searching Authority from Korean Intellectual Property Office dated Jul. 6, 2009 for relating International Application No. PCT/US2008/077707.
Extended Search Report from European Patent Office dated Sep. 13, 2010 for relating European Application No. EP08834106.

* cited by examiner

*Primary Examiner* — Karl D Frech
(74) *Attorney, Agent, or Firm* — Klein, O'Neill & Singh, LLP

(57) ABSTRACT

A transaction card wherein at least a portion of the card is carbon.

9 Claims, 2 Drawing Sheets

CARBON TRANSACTION CARD

CROSS-REFERENCE TO RELATED APPLICATIONS

This application claims priority to provisional application Ser. No. 60/975,051, filed on Sep. 25, 2007, the entire contents of which are hereby incorporated by reference.

BACKGROUND

The present invention relates to transaction cards, such as credit cards and debit cards, that are used as substitutes for cash.

DESCRIPTION OF RELATED ART

The vast majority of transaction cards in use today are constructed of plastic. These cards tend to be flimsy and wear out or break easily.

SUMMARY

The preferred embodiments of the present carbon transaction card have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description of the Preferred Embodiments," one will understand how the features of the present embodiments provide advantages, which include increased strength and durability, greater rigidity, decreased weight, longer lifespan, enhanced feel and high tech look.

One embodiment of the present carbon transaction card comprises a substantially planar sheet having a front surface, a back surface and a continuous peripheral edge. At least a portion of the planar sheet is carbon.

BRIEF DESCRIPTION OF THE DRAWINGS

The preferred embodiments of the present carbon transaction card will now be discussed in detail with an emphasis on highlighting the advantageous features. These embodiments depict the novel and non-obvious transaction card shown in the accompanying drawings, which are for illustrative purposes only. These drawings include the following figures, in which like numerals indicate like parts.

DETAILED DESCRIPTION OF THE PREFERRED EMBODIMENTS

Figure 1:
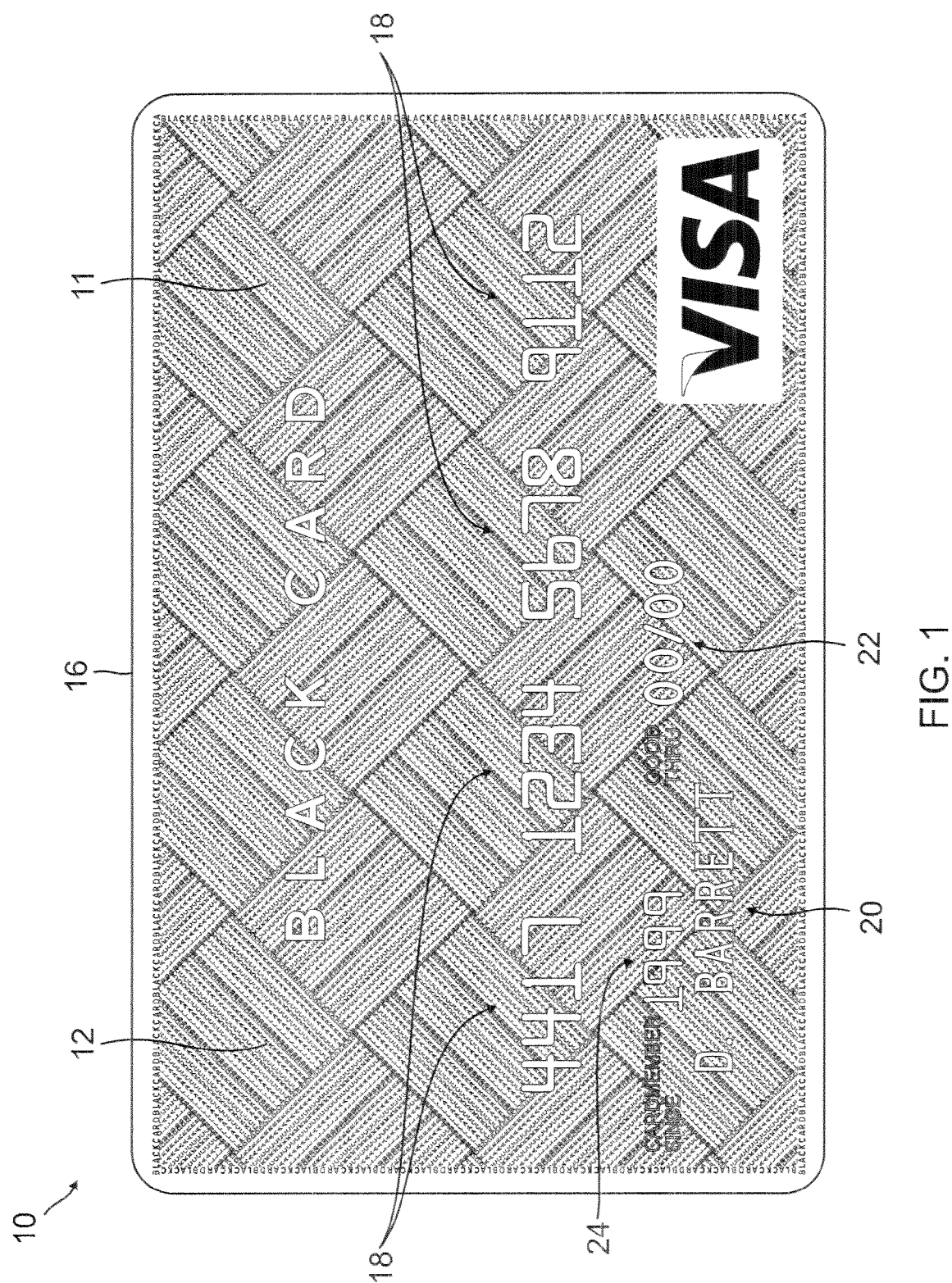
FIG. 1 is a front elevation view of one embodiment of the present carbon transaction card.
Figure 2:
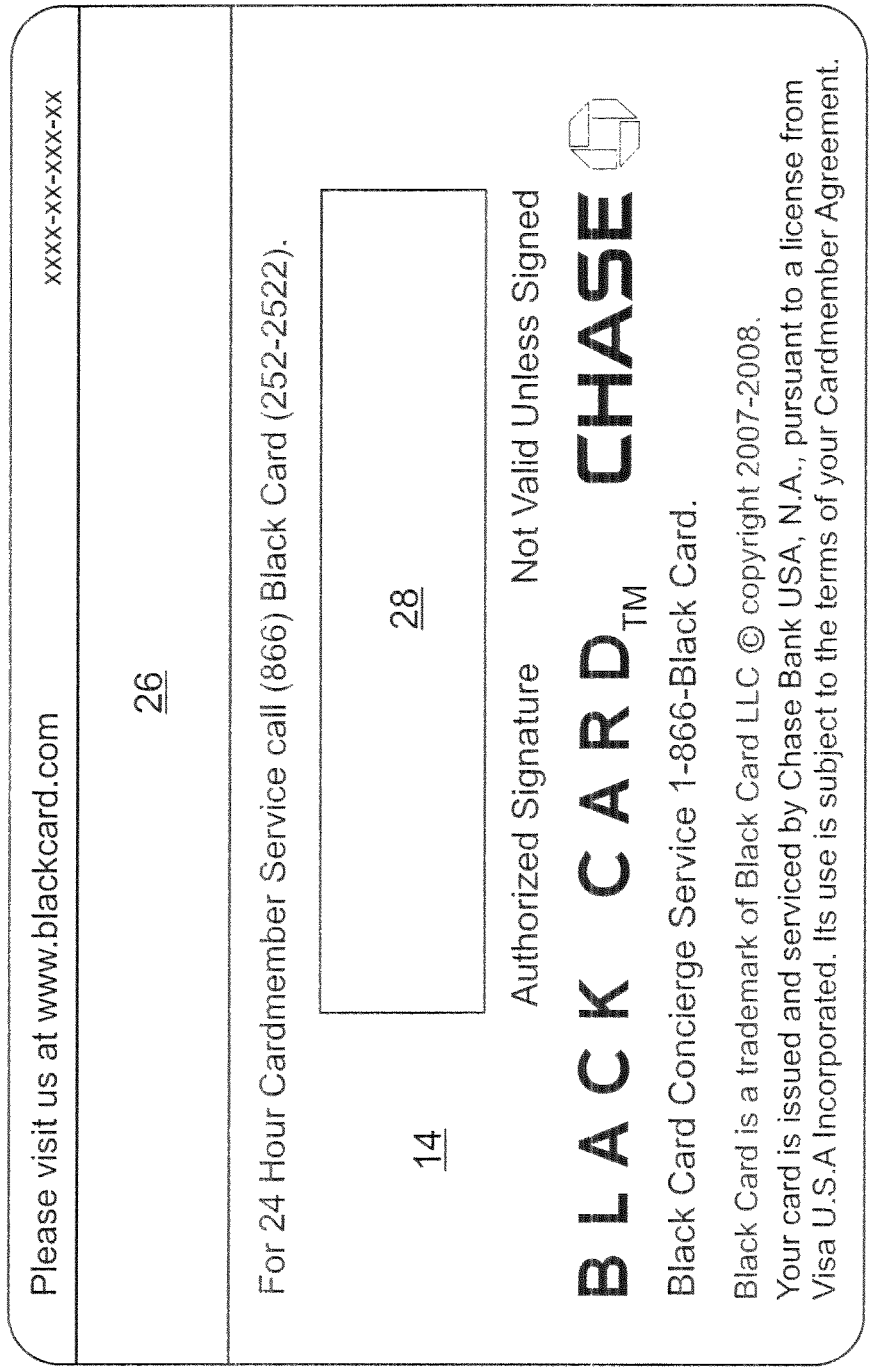
FIG. 2 is a rear elevation view of the carbon transaction card of FIG. 1.

With reference to FIGS. 1 and 2, the present transaction card 10 is a substantially planar sheet 11 having a front surface 12 and a back surface 14. The card 10 includes a continuous peripheral edge 16, which in the illustrated embodiment is substantially rectangular. However, those of ordinary skill in the art will appreciate that the card 10 could have virtually any shape, such as square, round or hexagonal. The scope of the present card 10 is not limited to any particular shape.

In the illustrated embodiment, the transaction card 10 bears a number 18 (FIG. 1) that identifies the card 10 as being associated with a particular account. In the illustrated embodiment, the account number 18 has sixteen digits. However, in alternative embodiments the card 10 may have fewer or more digits. The card 10 also bears the name 20 of the card holder and an expiration date 22. In certain embodiments, the card 10 may also bear a year 24 or date on which the card holder first acquired the card 10. The information displayed on the card 10 may be applied in a conventional manner, such as embossing and/or printing.

With reference to FIG. 2, the back surface 14 of the present transaction card 10 includes a magnetic strip 26. The magnetic strip 26 stores information that is readable by a magnetic reader. For example, the magnetic strip 26 may contain a series of digits from which the magnetic card reader can obtain information about the account associated with the card 10 and/or the card holder. The back surface 14 of the present transaction card 10 further includes a signature panel 28.

While not shown in the figures, other embodiments of the present transaction card 10 may include additional features, such as an embedded microchip, a holographic image, etc. The card 10 may further include one or more transparent portions. Such transparent portions may include one or more optically recognizable layers or infrared-blocking ink to allow the transparent portion(s) to be recognized by an optical card reader. These additional features may allow the transaction card 10 to function more easily, efficiently, and/or more securely.

With reference to FIG. 1, the planar sheet 11 is constructed at least in part from carbon. The carbon may be in any of a variety of forms, such as carbon graphite and/or carbon fiber. In carbon fiber embodiments the carbon portion may comprise a woven carbon fabric, giving the card 10 the woven appearance shown in FIG. 1. In certain embodiments the sheet 11 may be entirely carbon, and in certain other embodiments the sheet 11 may include multiple layers, with at least one of the layers being carbon. In multi-layer embodiments, additional layers may be, for example, one or more polymeric materials. For example, outer layers of the card 10 may be polymeric while inner layers of the card 10 are carbon, or vice versa. The percentage of carbon and/or carbon graphite in the card 10 may vary and may be up to 100%. The adaptive embodiments are not limited to any particular ratio or percentage of carbon/carbon graphite or the type and form of carbon.

The vast majority of today's transaction cards are constructed of plastic. The present carbon transaction card 10 is advantageously stronger and more durable than such plastic cards. It is also more rigid, lighter, and has a longer lifespan. In addition to these benefits, the carbon provides the card 10 with a unique feel and high tech look. The card 10 is thus more desirable for its distinctiveness over a typical plastic card.

SCOPE OF THE DISCLOSURE

The above description presents the best mode contemplated for carrying out the present carbon transaction card, and of the manner and process of making and using it, in such full, clear, concise, and exact terms as to enable any person skilled in the art to which it pertains to make and use this transaction card. This transaction card is, however, susceptible to modifications and alternate constructions from that discussed above that are fully equivalent. Consequently, this transaction card is not limited to the particular embodiments disclosed. On the contrary, this transaction card covers all modifications and alternate constructions coming within the spirit and scope of the transaction card as generally expressed by the following claims, which particularly point out and distinctly claim the subject matter of the transaction card.

What is claimed is:

1. A transaction card, comprising:
a substantially planar sheet having a front surface, a back surface and a continuous peripheral edge; wherein the front surface includes interlocking strips of repeated strings of a name of the card giving the front surface a woven fabric appearance and
a magnetic strip on the back surface, the magnetic strip storing information that is readable by a magnetic reader; the information comprising a series of digits from which the magnetic reader can obtain information about an account associated with the card or a holder of the card; wherein the planar sheet is at least 5% of woven carbon fabric.

2. The transaction card of claim 1, wherein the planar sheet is carbon graphite or carbon fiber.

3. The transaction card of claim 1, wherein the information comprises a series of digits from which the magnetic card reader can obtain information about an account associated with the card or a holder of the card.

4. The transaction card of claim 1, further comprising a number on the front surface that identifies the card as being associated with a particular account.

5. The transaction card of claim 1, further comprising a name of a holder of the card on the front surface.

6. The transaction card of claim 1, further comprising an expiration date on the front surface.

7. The transaction card of claim 1, further comprising a year or date on which a holder of the card first acquired the card.

8. The transaction card of claim 1, further comprising a signature panel on the back surface.

9. The transaction card of claim 1, wherein the sheet includes multiple layers, and outer layers are polymeric while at least one inner layer is carbon.

* * * * *